United States Patent [19]
Stockton

[11] 3,741,693
[45] June 26, 1973

[54] REVERSELY DRIVABLE FLUIDIC DEVICE
[75] Inventor: Thomas R. Stockton, Ann Arbor, Mich.
[73] Assignee: Ford Motor Company, Dearborn, Mich.
[22] Filed: Oct. 7, 1971
[21] Appl. No.: 187,486

Related U.S. Application Data
[62] Division of Ser. No. 52,308, July 6, 1970, Pat. No. 3,628,623.

[52] U.S. Cl.................... 418/15, 418/19, 418/29, 418/32
[51] Int. Cl...... F01c 21/16, F03c 3/00, F04c 15/04
[58] Field of Search.............. 418/15, 19, 29, 107, 418/108, 109, 32; 60/52 S; 180/79.2

[56] References Cited
UNITED STATES PATENTS

| 2,659,314 | 11/1953 | Wood | 418/32 |
| 917,466 | 4/1909 | Lees | 418/32 |
| 2,836,960 | 6/1958 | Wittren | 60/52 S |
| 2,948,228 | 8/1960 | Ahlen | 418/19 |
| 3,107,629 | 10/1963 | Wiggermann | 418/19 |
| 3,233,407 | 2/1966 | Smith | 60/52 S |

Primary Examiner—Carlton R. Croyle
Assistant Examiner—John J. Vrablik
Attorney—John R. Faulkner

[57] ABSTRACT

A reversely drivable double gear fluid motor adaptable for use in a vehicle power steering system in which linear displacement of one of the gears in a direction perpendicular to its axis of rotation within the gear chamber determines the direction of rotation of the motor.

7 Claims, 2 Drawing Figures

REVERSELY DRIVABLE FLUIDIC DEVICE

This is a division of application Ser. No. 52,308, filed July 6, 1970 now U.S. Pat. No. 3,628,623.

BACKGROUND AND SUMMARY OF THE INVENTION

A conventional power assisted rack and pinion steering system used on automotive vehicles today includes a pump and reservoir, a control valve and a two-way cylinder. The power cylinder may either be in combination with the rack or independent therefrom. The present invention provides an improved and novel fluidic device adaptable for use in automotive power steering systems to reduce the cost and complexity of such systems.

A fluidic device constructed in accordance with this invention comprises a reversely drivable double gear motor. The motor includes a housing having a chamber in which a pair of meshing gears are rotatably received. A first fluid inlet enters the chamber adjacent the meshing gear teeth on one side thereof; a second fluid inlet enters the chamber on the other side of the meshing gear teeth. A fluid outlet from the chamber is formed in one end of the housing and is spaced from the inlets. The gear adjacent the outlet is linearly, as well as angularly, displaceable in a direction generally perpendicular to the plane of the parallel axis of rotation of the pair of gears. When the gear is in one position of extreme linear displacement, the first inlet is sealed from the outlet by the gear teeth engaging the chamber wall adjacent the first inlet, while the second inlet is simultaneously vented to the outlet because of a space between the gear teeth and the chamber wall adjacent the second inlet. With the gear in this position, the gears are driven by the fluid pressure in one set of directions. Similarly, when the gear is in the opposite position of extreme linear displacement the second inlet is sealed from the outlet and the first inlet is vented causing rotation of the gears in the opposite set of directions.

The motor is particularly adapted for use as a power assistance device with a rack and pinion steering mechanism. In such a system, the linearly displaceable gear is the pinion gear and engages the steering rack which, in turn, is linked to the vehicle wheels. The vehicle steering shaft is connected to the linearly displaceable gear and turns with the steering wheel.

DETAILED DESCRIPTION OF A PREFERRED EMBODIMENT

Figure 1:
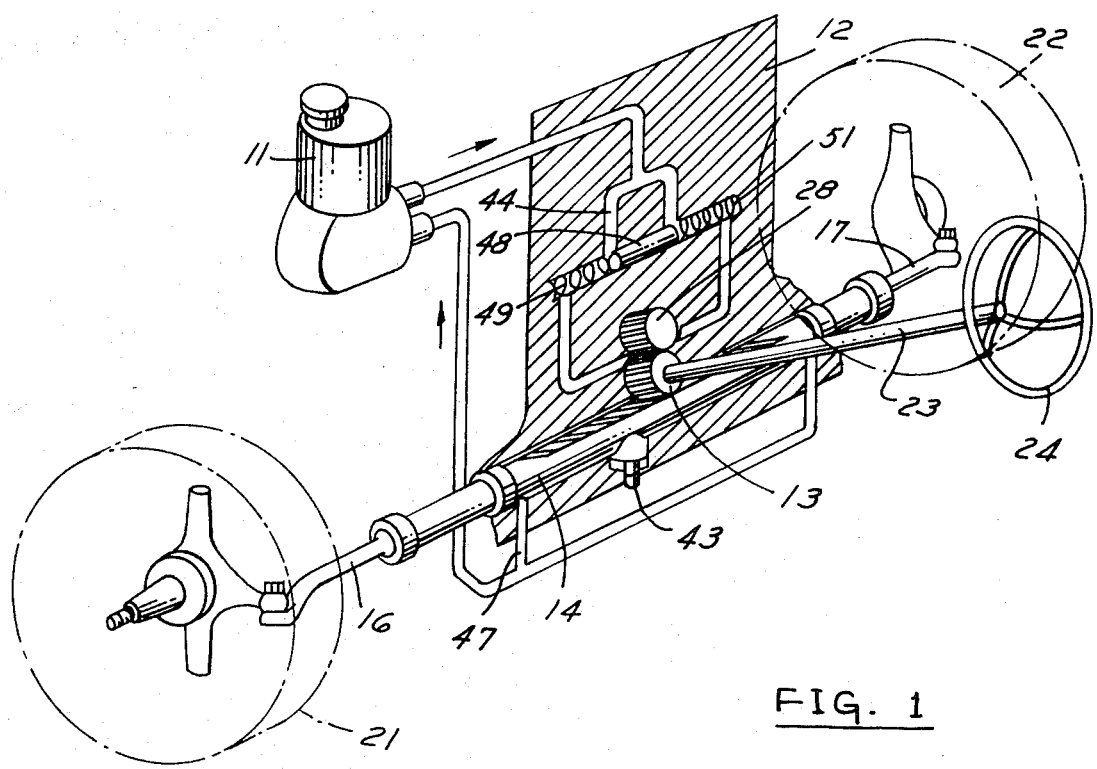
FIG. 1 of the drawings shows a schematic drawing of a vehicle power steering system incorporating the invention.

FIG. 1 of the drawings shows a rack and pinion automotive power steering assembly. A gear pump 11 provides a source of pressurized fluid to the fluid motor 12. One of the gears of the pump is a pinion gear 13 cooperating with rack 14. A pair of connecting rods 16 and 17 interconnect the ends of the rack and wheel spindles 18 and 19 so that the longitudinal movements of the rack are transmitted to pivotal movements of the spindles and causing the wheels 21 and 22 (shown in phantom) to turn about substantially vertical steering axes a corresponding amount. The spindles are connected in a conventional manner to the vehicle body (not shown) by suspension arms (also not shown). A steering shaft 23 is connected to the pinion gear 13 imparting to it the rotational movements of steering wheel 24.

Figure 2:
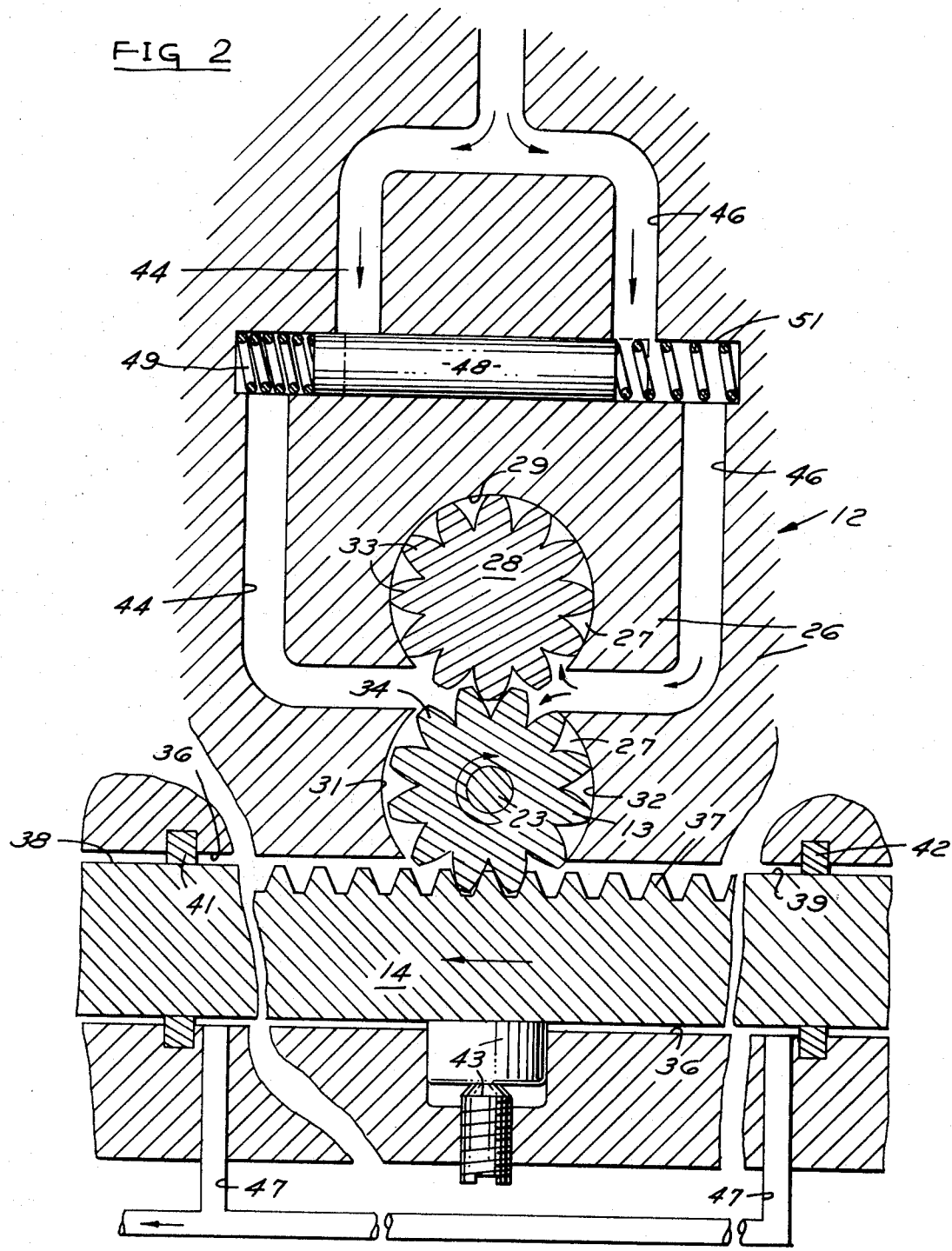
FIG. 2 is a cross section of the fluid motor of FIG. 1.

The fluid motor 12, shown in greater detail in FIG. 2, includes a housing 26 having a chamber 27 formed therein which includes a pair of meshing rotatable spur gears 13 and 28. The chamber includes a first cylindrical arced portion 29 which rotatably receives spur gear or idler gear 28 and confines the gear for rotation about a fixed axis. The chamber includes a second portion having cylindrical arced surfaces 31 and 32 which rotatably receives pinion gear 13 and confines it to rotation about an axis which is limitedly displaceable in the longitudinal direction of the rack 14. The cylindrical arced surface 29 of the chamber has a radius substantially equal to the outer circumference of the idler gear 28 so that the ends of the gear teeth 33 are in sealing contact with the cylindrical arced surfaces 29. Similarly, the cylindrical arced surfaces 31 and 32 of the chamber have radii substantially equal to that of the pinion gear 13 so that when ends of gear teeth 34 are in contact with surface 31 or 32, sealing engagement is established. While surfaces 31 and 33 have radii of a common magnitude, their respective centers are spaced in the longitudinal direction of the rack 14 an amount equal to the range of linear displacement of pinion gear 13. Rack member 14 is slidingly receivable in a cylinder 36 which is in communication with chamber 27. The rack has teeth 37 which mesh with the teeth of the pinion gear 13 so that rotary movement of that gear provides a linear or longitudinal displacement of the rack.

The rack has cylindrical ends 38 and 39 engagable with seal means 41 and 42 mounted in housing 26. A threaded adjustment means 43 engages the bottom side of the rack so that as wear occurs between the teeth of the rack and the pinion gear, the rack may be adjusted upwardly to assure proper engagement of the gear and rack teeth.

A first inlet passage 44 communicates one side of the chamber 27 with the source of pressurized fluid. Similarly, a second inlet passage 46 communicates the other side of the chamber with the source of pressurized fluid. Outlet passages 47 lead from the rack cylinder and are in communication with the low pressure side of the pump 11 or with the pump reservoir.

A shuttle valve 48 is reciprocably mounted in the housing and biased to a normal position in which both the first and second inlet passages 44 and 46 are unrestricted. The valve is axially movable against the force of springs 49 and 51 to one extreme position which closes off the first inlet passage and, alternatively, to the opposite extreme position which closes the second inlet passage.

OPERATION

The function of the described system is to provide power assisted steering in an automotive vehicle. The system is controlled by steering wheel 24 acting through the steering shaft 23 to provide a torque on the pinion gear 13. When no torque is placed on the steering wheel, the pinion gear 13 is in a neutral position permitting passage of fluid from both the first inlet 44 and second inlet 46 along the cylindrical walls 31 and 32, respectively, of the chamber 27 and eventually through the outlets 47 from the rack cylinder 36. The shuttle valve 48 is biased by springs 49 and 51 to a normal position (as shown by the broken line in FIG. 2) in which both the first and second inlet passages are open. As a clockwise torque is applied to the pinion gear 13 by the vehicle operator turning the steering wheel 24, the pinion gear is displaced from its neutral position rightwardly to the position shown in FIG. 2 in which the gear teeth sealingly engage right-hand cylindrical arced surface 32 of the chamber 27. Upon this occurrence, the left-hand inlet 44 to the chamber remains vented to the outlet 47. Fluid pressure increases in the inlet passage 46 which displaces the shuttle valve 48 leftwardly to the position shown in FIG. 2 to completely close off the passage 44. Conditions are thus set up for the gears 13 and 28 to function within chamber 27 as a double gear fluid motor. The pressure of the fluid in inlet 46 urges the pinion gear 13 in a clockwise direction and the idler gear 28 in a counterclockwise direction. The torque provided to the pinion gear from the steering wheel 24 by the vehicle operator and the power assist from the fluid motor 12 combine to move the rack 14 leftwardly and to cause front wheels 21 and 22 to turn the vehicle in a rightwardly direction. For left-hand turns, the functioning of the system would be similar but the fluid motor 12 would operate in a reversed direction.

Further modifications and alterations will occur to those skilled in the art which are included within the scope of the following claims.

I claim:

1. A reversely operable fluidic device including a housing,
   a chamber formed in the housing,
   a pair of gears having meshingly engagable teeth rotatably received within the chamber,
   one of the gears being linearly displaceable within the chamber between first and second positions, the other of the gears being rotatable about a given axis,
   first and second inlets communicating the chamber and a source of fluid pressure and being separated by the gears,
   outlet means from the chamber spaced from the first and second inlets,
   the linearly displaceable gear in the first position being constructed to vent the first inlet and seal the second inlet from the outlet,
   the linearly displaceable gear in the second position being constructed to vent the second inlet and seal the first inlet from the outlet,
   means other than said other gear being engagable with said displaceable gear and movable to determine the position of the axis of said displaceable gear.

2. A fluidic device according to claim 1 and including the linearly displaceable gear being movable in a direction substantially perpendicular to its axis of rotation.

3. A fluidic device according to claim 1 and including the chamber being formed with cylindrical arced surfaces engagable with each of the gears to form slidingly sealable contacts therebetween.

4. A reversely drivable fluid motor including a housing,
   a chamber formed in the housing,
   a pair of gears having teeth in meshing engagement rotatably received within the chamber, said gears having parallel axes of rotation,
   the chamber having one portion with cylindrical arcs confining a first of the gears for rotation about a substantially fixed axis relative to the housing,
   the chamber having another portion with cylindrical arcs confining a second of the gears for rotation about an axis limitedly displaceable relative to the housing,
   the axes of the gears defining a plane, the second gear being displaceable in a direction generally perpendicular to the plane of the axes of the gears,
   first and second inlet means and passages communicating said chamber and a source of fluid pressure, said first and second inlet means to the chamber being separated by the meshing gear teeth,
   outlet means from the chamber in communication with the first inlet means and sealed from the second inlet means by the second gear when the second gear is in a position of maximum displacement in one direction,
   the outlet means being in communication with the second inlet means and sealed from the first inlet means by the second gear when the second gear is in a position of maximum displacement in the other direction,
   pressurization of the fluid in the first inlet means rotatively driving the gears in one set of directions, pressurization of the fluid in the second inlet means rotatively driving the gears in the opposite set of directions,
   a member having a plurality of teeth engageable with said displaceable gear and movable to determine the position of the axis of said displaceable gear,
   valve means positioned within said first passage and said second passage biased to a normal position communicating both the first inlet and the second inlet with the source of fluid pressure,
   said valve means being movable in response to differential pressure between said first and second passages to close the passage experiencing the lesser pressure.

5. A fluid motor according to claim 4 wherein the second gear has a neutral position between the positions of maximum displacement in which the first and second inlet means are each vented to the outlet means.

6. A fluid motor according to claim 4 and including valve means responsive to pressure differential between the first and second inlet passages and movable to alternately block the first and second passages,
   the inlets each being open when the valve means is in a normal position.

7. A reversely operable fluidic device including a housing,
   a chamber formed in the housing,
   a pair of gears having meshingly engageable teeth rotatably received within the chamber,
   one of the gears being linearly displaceable within the chamber between first and second positions,
   first and second inlets and passages communicating the chamber and a source of fluid pressure and being separated by the gears,
   outlet means from the chamber spaced from the first and second inlets, the linearly displaceable gear in the first position being constructed to vent the first inlet and seal the second inlet from the outlet, the linearly displaceable gear in the second position being constructed to vent the second inlet and seal the first inlet from the outlet, valve means positioned within said first passage and said second passage biased to a normal position communicating both the first inlet and the second inlet with the source of fluid pressure, said valve means being movable in response to differential pressures between said first and second passages to close the passage experiencing the lesser pressure.

* * * * *